(12) United States Patent
Kim

(10) Patent No.: US 12,307,106 B2
(45) Date of Patent: May 20, 2025

(54) METHOD OF EXTENDING REMOTE FUNCTION AND REMOTE FUNCTION EXTENSION DEVICE FOR PERFORMING THE METHOD

(71) Applicant: ELECTRONICS AND TELECOMMUNICATIONS RESEARCH INSTITUTE, Daejeon (KR)

(72) Inventor: Bup Joong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/224,747

(22) Filed: Jul. 21, 2023

(65) Prior Publication Data

US 2024/0160366 A1 May 16, 2024

(30) Foreign Application Priority Data

Nov. 11, 2022 (KR) .................. 10-2022-0150448

(51) Int. Cl.
  *G06F 3/06* (2006.01)
(52) U.S. Cl.
  CPC .......... *G06F 3/0631* (2013.01); *G06F 3/0604* (2013.01); *G06F 3/067* (2013.01)
(58) Field of Classification Search
  CPC ....... G06F 3/067; G06F 3/065; G06F 11/2056
  See application file for complete search history.

(56) References Cited

U.S. PATENT DOCUMENTS

| 8,176,012 | B1* | 5/2012 | Rabii ................. G06F 16/1824 |
|           |     |        | 707/655 |
| 11,681,646 | B1* | 6/2023 | Miglani .............. G06F 13/1668 |
|           |     |        | 710/306 |
| 2012/0159116 | A1 | 6/2012 | Lim et al. |
| 2014/0143889 | A1* | 5/2014 | Ginter ..................... G06F 21/87 |
|           |     |        | 726/27 |
| 2019/0034286 | A1* | 1/2019 | Brown .................. G06F 3/0619 |
| 2019/0114079 | A1 | 4/2019 | Kim et al. |
| 2021/0334143 | A1* | 10/2021 | Kim ...................... G06F 15/167 |
| 2022/0066636 | A1* | 3/2022 | Taki ...................... G06F 3/0679 |

FOREIGN PATENT DOCUMENTS

| JP | 2010-176201 A | 8/2010 |
| KR | 10-2005-0022981 A | 3/2005 |
| KR | 10-0687628 B1 | 2/2007 |
| KR | 10-1119870 B1 | 3/2012 |
| KR | 10-2021-0132348 A | 11/2021 |
| KR | 10-2022-0000415 A | 1/2022 |
| KR | 10-2372424 B1 | 3/2022 |
| KR | 10-2022-0118756 A | 8/2022 |

* cited by examiner

*Primary Examiner* — Hosain T Alam
*Assistant Examiner* — Nicholas A. Paperno
(74) *Attorney, Agent, or Firm* — LRK PATENT LAW FIRM

(57) ABSTRACT

Provided is a method of extending a remote function such that a server in operation may extend the remote function through an optical connection network without distance limitations. More specifically, the method may be used to link operations between two or more devices connected to the optical connection network, and a method of mirroring a remote function of a memory an accelerator, and the like, in a local function of the server through the optical connection network may be provided.

18 Claims, 9 Drawing Sheets

METHOD OF EXTENDING REMOTE FUNCTION AND REMOTE FUNCTION EXTENSION DEVICE FOR PERFORMING THE METHOD

CROSS-REFERENCE TO RELATED APPLICATION

This application claims the benefit of Korean Patent Application No. 10-2022-0150448 filed on Nov. 11, 2022, in the Korean Intellectual Property Office, the entire disclosure of which is incorporated herein by reference for all purposes.

BACKGROUND

1. Field of the Invention

One or more embodiments relate to a method of extending a remote function, and more particularly, to a method and device in which a server in operation may extend a remote function without distance limitations through an optical connection network.

2. Description of Related Art

Recently, a growing demand for sharing and relaying video data through the Internet has raised the importance of a role of a server. Here, the server may perform tasks including storing, classifying, transmitting, processing, and relaying data in a data center. The growing amount and type of data and an evolving processing method increase a demand for server performance and function extension.

Main resources included in a server may include a central processing unit (CPU), a local memory including random-access memory (RAM) and read-only memory (ROM), a data accelerator, a network access means, a disk, and the like. A server may basically provide one or more peripheral component interconnect express (PCIE) slots to additionally extend a function. In this case, when an empty area exists in a PCIE slot, server resources or a server function may be added to a server by adding an additional function card to a PCIE slot for extending server resources or a server function. Conversely, when no empty area exists in a PCIE slot, server resources or a server function may not be easily added to a server.

Recently, a method of extending a remote function using a compute express link (CXL) method has been discussed along with a PCIE slot. The CXL method may be a physical layer matching method and may extend a function using a PCIE slot. Here, the CXL method may achieve target performance when 16 serial links supporting high-speed PCIE 5.0 (32 GT/s) are used.

Unfortunately, a server may not provide multiple CXL slots that use a large number of high-speed serial links. In addition, the server may use an electrical high-speed link for transmitting and processing high-speed data. In this case, as the speed of an electrical signal, which is used to transmit and process high-speed data, increases, a distance at which the electrical signal transmits data may significantly decrease. In addition, in order to extend a remote function, the bandwidth between a CPU and a function extension device may need to increase. However, when the bandwidth therebetween is high, a physical distance between the CPU and the function extension device may need to be close due to an issue of distance limitations of an electrical signal.

External resources may not be easily used for the extension of a CPU function due to the issue of the distance limitations.

In addition, when a remote function device is installed in a PCIE slot of a server, the server may inconveniently need to discontinue an existing remote function and may reboot along with a remote function device added to the PCIE slot. In addition, the extension of a remote function may need to be performed without interrupting an existing service of the server but a method of adding a function through an existing PCIE slot may cause the service interruption of the server.

SUMMARY

Embodiments provide a method of extending a remote function, in which a server may use external resources as if they were internal sources of the server without distance limitations such that the server in an operating state may easily extend a remote function and share a remote memory space without the suspension of the server.

Embodiments provide a method of extending a remote function, in which a remote function extension device is connected to an extension device by an optical connection network such that overhead with the remote function device may be minimized and the time to access data in the remote function device may be shortened.

According to an aspect, there is provided a method of extending a remote function, performed by a remote function extension device, the method including determining whether a remote memory of a remote function device is usable through a remote resource management agent of the remote function extension device, modifying a remote function, considering a result of the determining of whether the remote memory of the remote function device is usable, identifying whether the remote memory of the remote function device is mirrored in a local memory of a central processing unit (CPU), considering an access command of the CPU according to the modifying of the remote function, wherein the local memory is divided into a mirroring data memory and a mirroring tag memory, matching the local memory of the CPU to the remote memory of the remote function device so as to mirror with respect to the remote memory when the remote memory of the remote function device is not mirrored in the local memory of the CPU, and mirroring data of the remote memory in the mirroring data memory of the local memory when the matching is completed. The mirroring of the data of the remote memory may include locally mirroring, in the mirroring data memory of the local memory, data stored in one or more memory areas in the remote memory of the remote function device, wherein the remote memory is divided into a plurality of memory areas by the remote function extension device.

The modifying of the remote function according to an embodiment may include performing one of a resource collection connection function and a natural collection release function from the remote memory, considering whether the remote memory of the remote function device is usable, and modifying a state of the remote function extension device such that the remote function is extended in response to the performed function.

The identifying according to an embodiment may include identifying whether the remote memory is mirrored in the mirroring data memory by using at least one of a mirrored state matrix and a tag table included in the mirroring tag memory.

The identifying according to an embodiment may include, when the remote memory is mirrored in the mirroring data memory, performing relaying according to the access command such that the CPU accesses the data of the remote memory in the mirroring data memory.

The matching according to an embodiment may include registering, in the tag table, the plurality of memory areas included in the remote memory of the remote function device, and matching the plurality of memory areas to a plurality of mirroring areas included in the mirroring data memory by using a remote memory upper address that designates the plurality of memory areas when the registering is completed.

The mirroring according to an embodiment may include mirroring data pieces, which are stored in N memory areas among the plurality of memory areas included in the remote memory, in N mirroring areas, respectively, among a plurality of mirroring areas included in the mirroring data memory.

The mirroring according to an embodiment may include, when the data pieces stored in the N memory areas are mirrored in the N mirroring areas, respectively, displaying a state of the mirrored data pieces stored in the N memory areas on a mirrored state matrix as a mirrored state.

The minoring according to an embodiment may include, when data of the mirroring data memory is modified, displaying a state of the modified data on the mirrored state matrix as a modified state.

The minoring according to an embodiment may include identifying whether an empty space exists for a registration of the remote memory in a tag table when a request for the registration of the remote memory in the tag table is made, deleting an entry of the tag table, considering a number of uses with respect to a minoring area of the tag table when the empty space does not exist, and performing mirroring between the remote memory and the local memory by registering the remote memory in the tag table from which the entry is deleted.

The deleting according to an embodiment may include transmitting, to the remote function device, modified data and a local memory upper address of the minoring data memory when the modified data exists in the mirroring data memory before deleting a mirrored state matrix of the entry, and deleting the entry of the tag table when the transmitting of the modified data and the local memory upper address of the minoring data memory is completed.

According to another aspect, there is provided a method of extending a remote function, performed by a remote function extension device, the method including transmitting an access request message to a remote function device through an optical connection network by receiving the access request message for accessing data of a remote memory from a CPU, establishing an interconnection for available resources between the remote function extension device and the remote function device by receiving, from the remote function device, an access response message with respect to the access request message, and performing mirroring between a local memory of the CPU and the remote memory of the remote function device, considering an access command of the CPU according to the access response message.

The transmitting according to an embodiment may include extracting the access request message of the CPU with respect to the remote memory, converting a destination address of the access request message based on an address system of the remote memory and generating a serialized data request frame that is interpretable to the remote function device, and transmitting the data request frame to the remote function device through the optical connection network.

The establishing according to an embodiment may include receiving, from the remote function device, a data response frame related to the access response message in response to a data request frame, and extracting the access response message included in the data response frame and establishing an interconnection for available resources between the remote function extension device and the remote function device.

The performing according to an embodiment may include determining whether the remote memory of the remote function device is usable through a remote resource management agent of the remote function extension device, modifying a remote function, considering a result of the determining of whether the remote memory of the remote function device is usable, identifying whether the remote memory of the remote function device is mirrored in the local memory of the CPU, considering an access command of the CPU according to the modifying of the remote function, wherein the local memory is divided into a mirroring data memory and a mirroring tag memory, matching the local memory of the CPU to the remote memory of the remote function device so as to mirror with respect to the remote memory when the remote memory of the remote function device is not mirrored in the local memory of the CPU, and mirroring data of the remote memory in the mirroring data memory of the local memory when the matching is completed. The mirroring may include locally mirroring, in the mirroring data memory of the local memory, data stored in one or more memory areas in the remote memory of the remote function device, wherein the remote memory is divided into a plurality of memory areas by the remote function extension device.

The matching according to an embodiment may include registering the plurality of memory areas included in the remote memory of the remote function device in a tag table of the mirroring tag memory, and matching the plurality of memory areas to a plurality of mirroring areas included in the mirroring data memory by using a remote memory upper address that designates the plurality of memory areas when the registering is completed.

The mirroring according to an embodiment may include mirroring data pieces, which are stored in N memory areas among the plurality of memory areas included in the remote memory, in N mirroring areas, respectively, among a plurality of mirroring areas included in the mirroring data memory according to the interconnection.

The mirroring according to an embodiment may include, when the data pieces stored in the N memory areas are mirrored in the N mirroring areas, respectively, displaying a state of the mirrored data pieces stored in N memory areas on a mirrored state matrix as a mirrored state.

The mirroring according to an embodiment may include, when data of the mirroring data memory is modified, displaying a state of the modified data on the mirrored state matrix as a modified state.

The mirroring according to an embodiment may include when data of the mirroring data memory is modified, displaying a state of the modified data on the mirrored state matrix, as a modified state.

The mirroring according to an embodiment may include identifying whether an empty space exists for a registration of the remote memory in a tag table when a request for the registration of the remote memory in the tag table is made, deleting an entry of the tag table, considering a number of uses with respect to a mirroring area of the tag table when the empty space does not exist, and performing mirroring between the remote memory and the local memory by registering the remote memory in the tag table from which the entry is deleted.

According to another aspect, there is provided a remote function extension device for performing a remote function extension method, the remote function extension device including a processor. The processor may be configured to determine whether a remote memory of a remote function device is usable through a remote resource management agent of the remote function extension device, modify a remote function, considering a result of the determining of whether the remote memory of the remote function device is usable, identify whether the remote memory of the remote function device is mirrored in a local memory of a CPU, considering an access command of the CPU according to the modifying of the remote function, wherein the local memory is divided into a mirroring data memory and a mirroring tag memory, match the local memory of the CPU to the remote memory of the remote function device so as to mirror with respect to the remote memory when the remote memory of the remote function device is not mirrored in the local memory of the CPU, and mirror data of the remote memory in the mirroring data memory of the local memory when the matching is completed. When the processor mirrors the data of the remote memory in the mirroring data memory, the processor may be configured to locally mirror, in the mirroring data memory of the local memory, data stored in one or more memory areas in the remote memory of the remote function device, wherein the remote memory is divided into a plurality of memory areas by the remote function extension device.

Additional aspects of embodiments will be set forth in part in the description which follows and, in part, will be apparent from the description, or may be learned by practice of the disclosure.

According to embodiments, a method of extending a remote function according to an embodiment may allow a server to use external resources as if they are internal sources of the server without distance limitations such that the server in operation may not discontinue but may easily extend a remote function.

A method of extending a remote function according to an embodiment may minimize overhead with a remote function device and shorten the time to access data in the remote function device by connecting a remote function extension device to the remote function device through an optical connection network.

A method of extending a remote function according to an embodiment may maintain data consistency between a remote function extension device and a remote memory by mirroring, in a local memory area of a CPU, a remote memory area corresponding to a portion of remote memory areas of the remote memory.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, embodiments will be described in detail with reference to the accompanying drawings.

Figure 1:
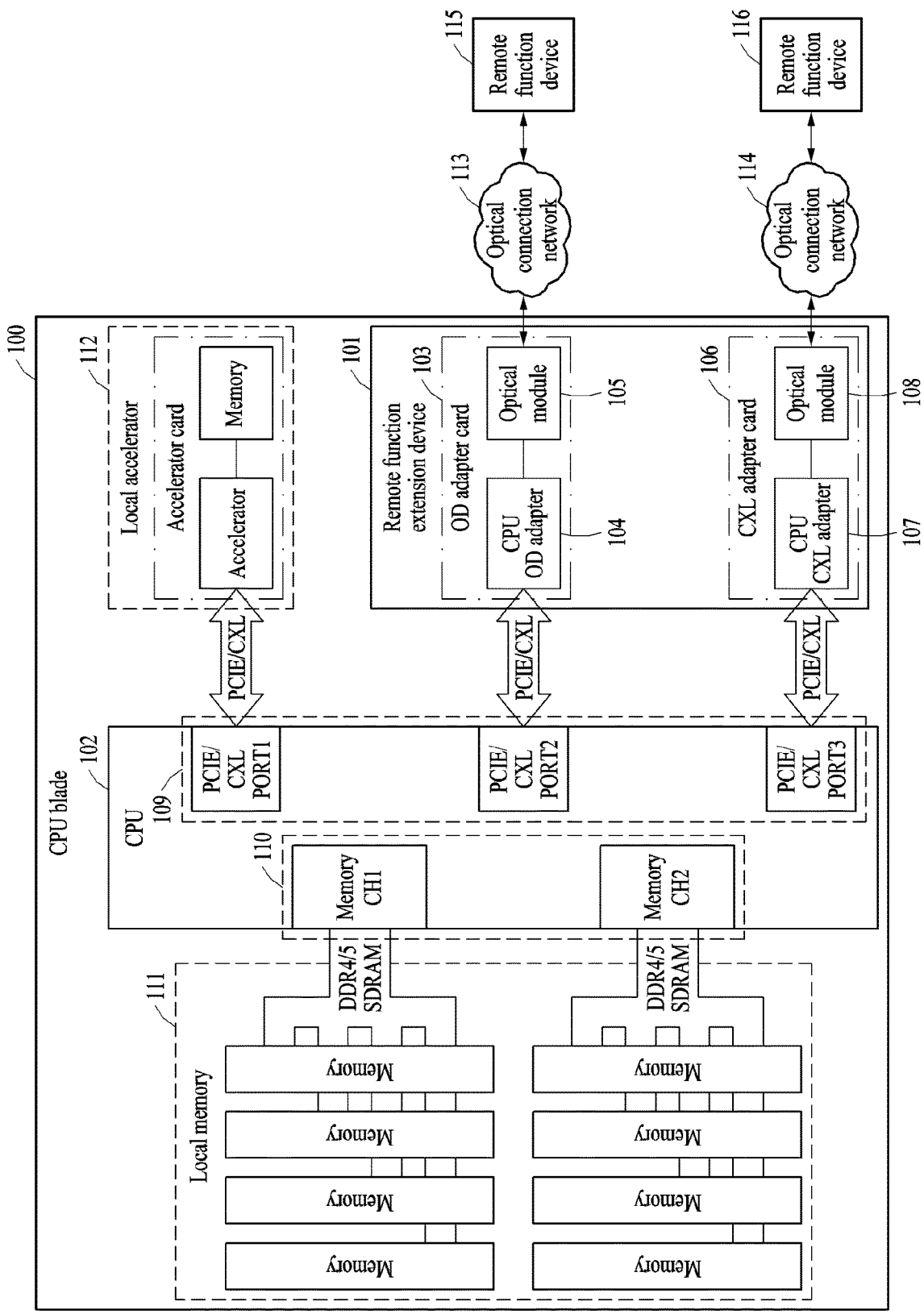
FIG. 1 is a conceptual diagram illustrating a remote function of a remote function extension device in a central processing unit (CPU), according to an embodiment.

FIG. 1 is a conceptual diagram illustrating a remote function of a remote function extension device in a central processing unit (CPU), according to an embodiment.

Referring to FIG. 1, the present disclosure may provide a method of extending a remote function, in which a CPU 102 uses, as functions of the CPU 102, remote functions of optical connection networks 113 and 114 through a remote function extension device 101.

More specifically, the CPU 102 of a CPU blade 100 may use a local memory 111 and a local accelerator 112 in the CPU blade 100 to execute a program and process data.

The CPU 102 may access the local memory 111 through a CPU memory channel 110 and access the local accelerator 112 through a CPU function extension port 109. The CPU 102 may need available resources for a memory in addition to the local memory 111 or available resources for an accelerator, which have a different type or performance from available resources for the local accelerator 112. The CPU 102 may mirror available resources (a memory or an accelerator) from remote function devices 115 and 116 through the remote function extension device 101.

In the present disclosure, the remote function extension device 101 may use at least one of an Optical Disaggregation (OD) adapter card 103 and a compute express link (CXL) adapter card 106. The remote function extension device 101 may access the CPU 102 through the CPU function extension port 109, similar to the local accelerator 112.

① OD Adapter Card

The OD adapter card 103 may include a CPU OD adapter 104 and an optical module 105. The CPU OD adapter 104 may convert a command and data of the CPU 102 into an OD frame and transmit a converted data request frame to the optical module 105. The optical module 105 may transmit the data request frame to the remote function device 115 via the optical connection network 113. The optical module 105 may receive, from the remote function device 115, a data response frame in response to the data request frame. The optical module 105 may convert the data response frame received from the remote function device 115 into data that the CPU 102 may recognize. The optical module 105 may transmit the converted data to the CPU 102. For example, the data request frame and the data response frame that are transmitted and received by the OD adapter card 103 may be an OD frame.

② CXL Adapter Card

The CXL adapter card 106 may include a CPU CXL adapter 107 and an optical module 108. The CPU CXL adapter 107 may convert a command and data of the CPU 102 into a data request frame and transmit the data request frame to the optical module 108. The optical module 108 may transmit the data request frame to the remote function device 116 via the optical connection network 114. The optical module 108 may convert a data response frame received from the remote function device 116 into data that the CPU 102 may recognize. The CPU CXL adapter 107 may convert the data response frame received from the optical module 108 into data that the CPU 102 may recognize and then transmit the data to the CPU 102. For example, the data request frame and the data response frame transmitted and received by the CXL adapter card 106 may be either an OD frame or a CXL frame.

The CPU 102 may request necessary available resources from a remote resource management module through a remote resource management agent of the remote function extension device 101. The remote resource management module may manage available resources of the remote function devices 115 and 116. Here, when the remote function devices 115 and 116 have available resources, the remote resource management module may set the optical connection networks 113 and 114 such that the remote function devices 115 and 116 may be connected to the remote function extension device 101.

When the CPU 102 attempts to release available resources of the remote function devices 115 and 116, the CPU 102 may request the remote resource management module to release the available resources through the remote resource management agent. The remote resource management module may change, to available states, states of the available resources of the remote function devices 115 and 116.

Figure 2:
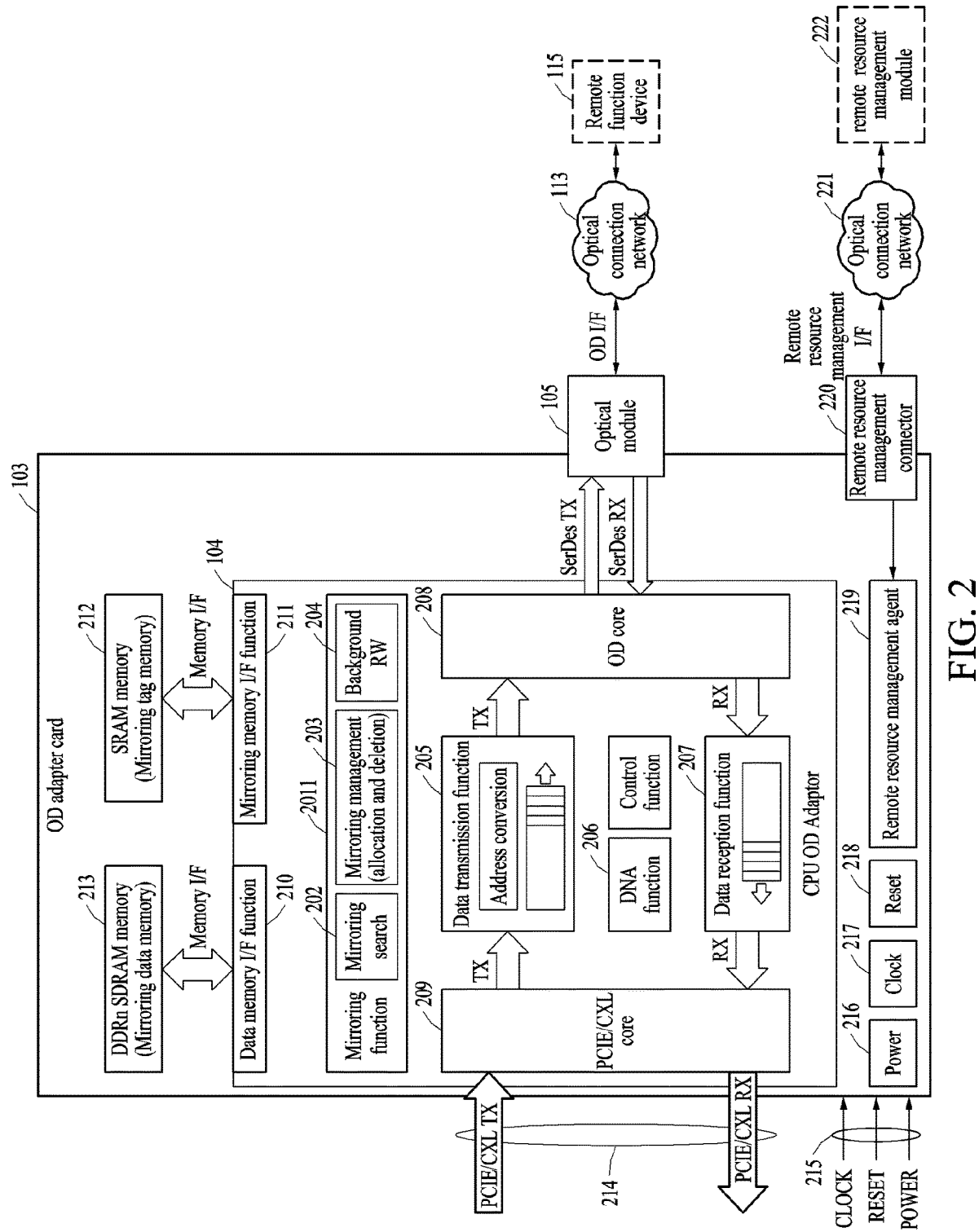
FIG. 2 is a conceptual diagram illustrating a remote function extension device using an Optical Disaggregation (OD) adapter card, according to an embodiment.

FIG. 2 is a conceptual diagram illustrating a remote function extension device using an OD adapter card, according to an embodiment.

Referring to FIG. 2, an OD adapter card 103 may include a CPU OD adapter 104, an optical module 105, a mirroring data memory 213, a mirroring tag memory 212, a remote resource management agent 219, and a remote resource management connector 220, a power function 216, a clock function 217, and a reset function 218.

The CPU OD adapter 104 may convert a command and data of a CPU into an OD frame and transmit the OD frame to the optical module 105. The CPU OD adapter 104 may convert the OD frame into data so that the CPU 102 may recognize the OD frame received from the optical module 105 and may then transmit the data to the CPU 102.

The CPU OD adapter 104 may divide an address space of a remote function device 115 into one or more memory areas and may perform a mirroring function 201 in which mirroring is locally performed on a memory area corresponding to a portion of the one or more divided memory areas. The mirroring function 201 may include a mirroring search function 202, a mirroring management function 203, and a background read and write (RW) function 204.

The CPU OD adapter 104 may perform operations below according to the mirroring search function 202. The CPU OD adapter 104 may check whether a local memory 111 has remote memory areas of the remote function device 115 that the CPU 102 attempts to access. The CPU OD adapter 104 may check whether there is the mirroring data memory 213 of the local memory 111 through a tag table of the mirroring tag memory 212 and a mirroring status matrix.

When data of the remote memory areas exist in the mirroring data memory 213, the CPU 102 may access the data of the remote memory areas in the mirroring data memory 213 through relaying of the CPU OD adapter 104.

The CPU OD adapter 104 may perform operations below according to the mirroring management function 203. When the remote memory areas of the remote function device 115, which the CPU 102 attempts to access, do not exist in the mirroring data memory 213, the CPU OD adapter 104 may register the remote memory areas in a tag table. The CPU OD adapter 104 may match the remote memory areas to mirroring areas of a local memory.

When the CPU OD adapter 104 reads data from the remote memory areas, the CPU OD adapter 104 may store the read data in a data position of the mirroring areas of the local memory corresponding to a data position of the remote memory areas. The CPU OD adapter 104 may display a status of the data positions in a mirroring status matrix as a mirrored state.

Here, when the CPU 102 modifies data of the mirroring data memory 213, the CPU OD adapter 104 may display, as a modified state, a state of the data position in the mirrored state matrix based on the mirroring management function 203.

In addition, whenever the CPU 102 accesses data in the mirroring data memory 213, the CPU OD adapter 104 may increase a recent use count of the tag table according to the mirroring management function 203. The CPU OD adapter 104 may check whether the tag table 153 has no empty space for newly registering the remote memory areas. Here, the empty space may refer to an empty entry.

The CPU OD adapter 104 may check an entry, in which the recent use count is small, according to the mirroring management function 203 and delete the contents of the entry, in which the recent use count is small. The CPU OD adapter 104 may initialize a state value of the mirroring modification state matrix and a state value in the mirrored state matrix of the entry of which contents are deleted and then may newly register the remote memory areas in the deleted entry.

When data in a modified state exists, the CPU OD adapter 104 may transfer the modified data and an upper address of a remote memory to the remote function device 115 before initializing the mirroring modification state matrix of the deleted entry. The CPU OD adapter 104 may transmit a signal to the mirroring management function 203 or the background RW function 204 such that the mirroring management function 203 or the background RW function 204 may perform initialization.

The CPU OD adapter 104 may perform the background RW function 204 when the CPU 102 accesses data of the remote memory areas registered in the tag table. The CPU OD adapter 104 may pre-read data registered in the surroundings based on the data of the remote memory areas and store the pre-read data in the mirroring data memory 213. The CPU OD adapter 104 may update the mirrored state matrix as the pre-read data is stored in the mirroring data memory 213. In this case, a signal may be transmitted to the background RW function 204 or the mirroring management function 203 such that the background RW function 204 or the mirroring management function 203 may perform the update of mirrored state matrices.

In addition, when the number of modified states of the mirroring modification state matrix according to the background RW function 204 is equal to or greater than a predetermined number or when an entry in the tag table is deleted in the mirroring management function 203, the CPU OD adapter 104 may transmit, to the remote function device 115, a remote memory upper address of the remote memory and data, in which a state value of a mirroring modification state matrix is a modified state. The remote function device 115 may update the contents of the remote memory areas by receiving the data in a modified state and the upper address of the remote memory.

The mirroring data memory 213 may use the local memory 111 of the CPU OD adapter 104 and may also use an external memory through a data memory interface (I/F) function 210.

The mirroring tag memory 212 may use the local memory 111 of the CPU OD adapter 104 or an external memory through a mirroring memory I/F function 211.

A CPU I/F function 209 (corresponding to the PCIE/CXL core of FIG. 2) of the CPU OD adapter 104 may extract, from a CPU I/F input signal 214, an access request message of the CPU 102 with respect to the remote memory areas and may transmit, to an OD I/F function 208 (corresponding to the OD core of FIG. 2), an extracted access request through a data transmission function 205.

The data transmission function 205 may convert a destination address of the access request message according to an address system of the remote memory areas and transmit the converted destination address to the OD I/F function 208. In the OD I/F function 208 and the CPU I/F function 209, the data transmission function 205 may buffer a difference in speeds of message processing between the OD I/F function 208 and the CPU I/F function 209.

The OD I/F function 208 may convert the access request message into a data request frame that the remote function device 115 may interpret. The data request frame may be an electrical signal. The OD I/F function 208 may serialize the data request frame and transmit the serialized data request frame to the optical module 105. The optical module 105 may convert the serialized data request frame into an optical signal and transmit the optical signal to the optical connection network 113.

The optical module 105 of the OD adapter card 103 may convert the optical signal into a serialized data request frame and transmit the converted data request frame to the OD I/F function 208 of the CPU OD adapter 104. The OD I/F function 208 may extract an access response message for the access request message from the serialized data request frame and transmit the extracted access response message to a data reception function 207.

The data reception function 207 may transmit the access response message to the CPU I/F function 209, such that the data reception function 207 may buffer a difference in speeds of message processing between the OD I/F function 208 and the CPU I/F function 209.

The CPU I/F function 209 may include the access response message in a CPU I/F output signal 214 and transmit the included access response message to the CPU 102.

A direct memory address (DMA) function 206 of the CPU OD adapter 104 may store data of the remote memory areas in the local memory 111 or store data of the local memory 111 in the remote memory areas, without involving the CPU 102.

The remote resource management agent 219 may make a request for necessary resources to a remote resource management module 222 according to a remote resource request of the CPU 102. The remote resource management agent 219 may communicate with the remote resource management module 222 through the remote resource management network 221 or communicate with the remote resource management module 222 through a direct point-to-point connection. The remote resource management connector 220 may serve as a physical connector for the remote resource management agent 219. When the remote function device 115 has available resources, the remote resource management module 222 may set the optical connection network 113 so that the remote function device 115 may be optically connected to the OD adapter card 103. In addition, a function of each of the remote resource management agent 219 and the remote resource management connector 220 may also be performed using a network port (not shown) and the CPU 102 of the CPU blade 100.

The OD adapter card 103 may include the power function 216 for power supply and power management, the clock function 217 for supplying a clock to a key hardware element, and the reset function 218 for resetting a key hardware element. The OD adapter card 103 may receive an auxiliary signal input 215 from the outside and use the auxiliary signal input 215 for hardware operation.

Figure 3:
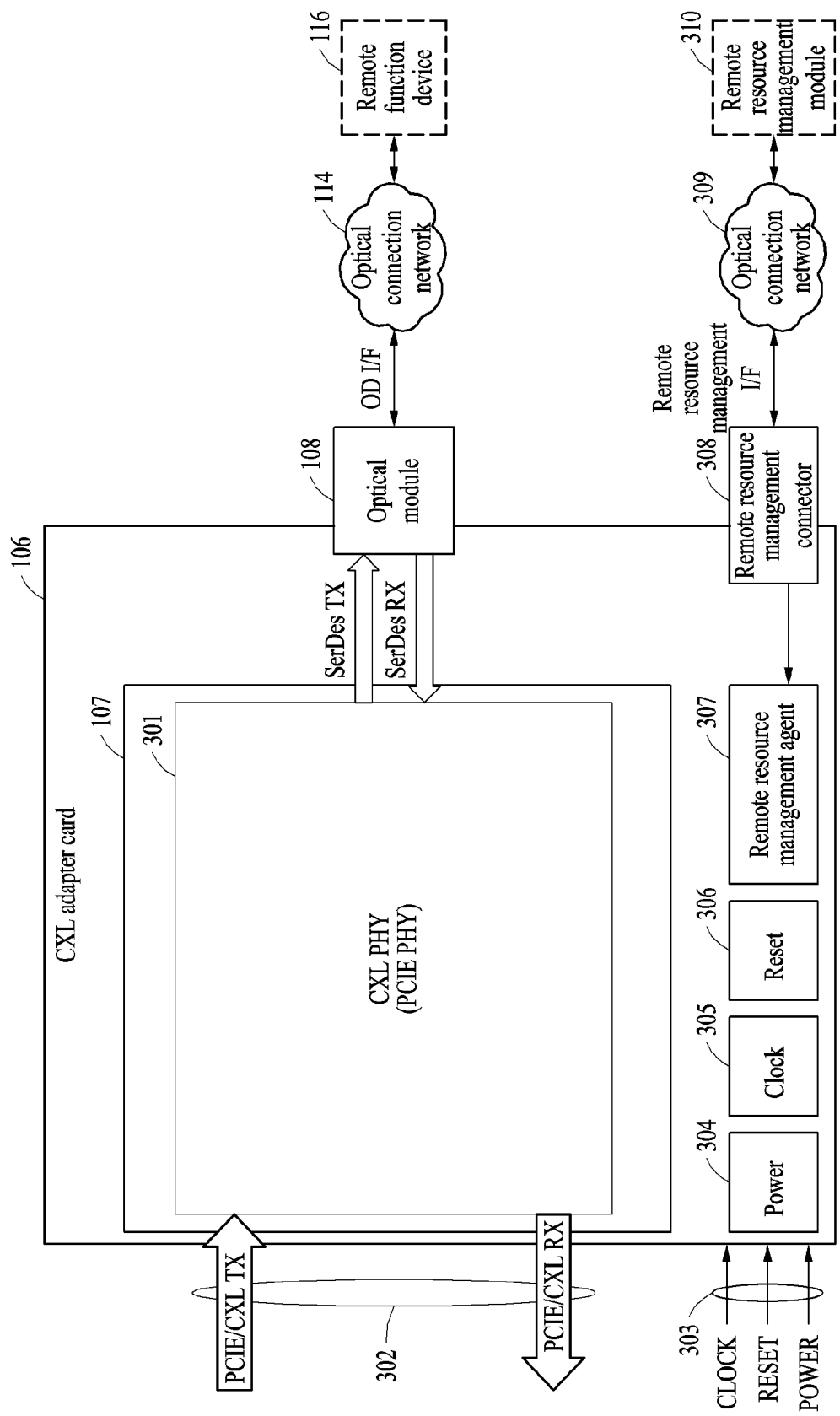
FIG. 3 is a conceptual diagram illustrating a remote function extension device using a compute express link (CXL) adapter card, according to another embodiment.

FIG. 3 is a conceptual diagram illustrating the remote function extension device using a CXL adapter card, according to another embodiment.

the remote function extension device 101 may use the CXL adapter card 106 based on a CXL method such that the CPU 102 may access a remote memory of a remote function device 116. Referring to FIG. 3, the CXL adapter card 106 may include the CPU CXL adapter 107, the optical module 108, a remote resource management agent 307, a remote resource management connector 308, a power function 304, a clock function 305, and a reset function 306.

A physical layer function 301 of the CPU CXL adapter 107 may extract a CXL physical layer signal (data) from a CPU OF input signal 302, may serialize the extracted CXL physical layer signal, and may transmit the serialized signal to the optical module 108. The optical module 108 may convert an electrical signal into an optical signal and transmit the optical signal to the remote function device 116 connected to an optical coupling network 114.

The optical module 108 of the CXL adapter card 106 may convert an optical signal into an electrical signal and transmit the electrical signal to the physical layer function 301 of the CPU CXL adapter 107. The physical layer function 301 may convert the electrical signal received from the optical module 108 into a CXL physical layer signal (data), load the CXL physical layer signal on a CPU IF output signal 302, and transmit the loaded signal to the CPU 102.

The remote resource management agent 307 may make a request for necessary resources to a remote resource management module 310 according to a remote resource request of the CPU 102. The remote resource management connector 308 may serve as a physical connector of the remote resource management agent 307. When the remote function device 116 has available resources, the remote resource management module 310 may set the optical connection network 114 such that the remote function device 116 is optically connected to the CXL adapter card 106.

The CXL adapter card 106 may include the power function 304 for power supply and power management, the clock function 305 for supplying a clock to a key hardware element, and the reset function 306 for resetting a key hardware element. Here, the CXL adapter card 106 may receive an auxiliary signal that is input from the outside and use the input auxiliary signal for hardware operation.

Figure 4:
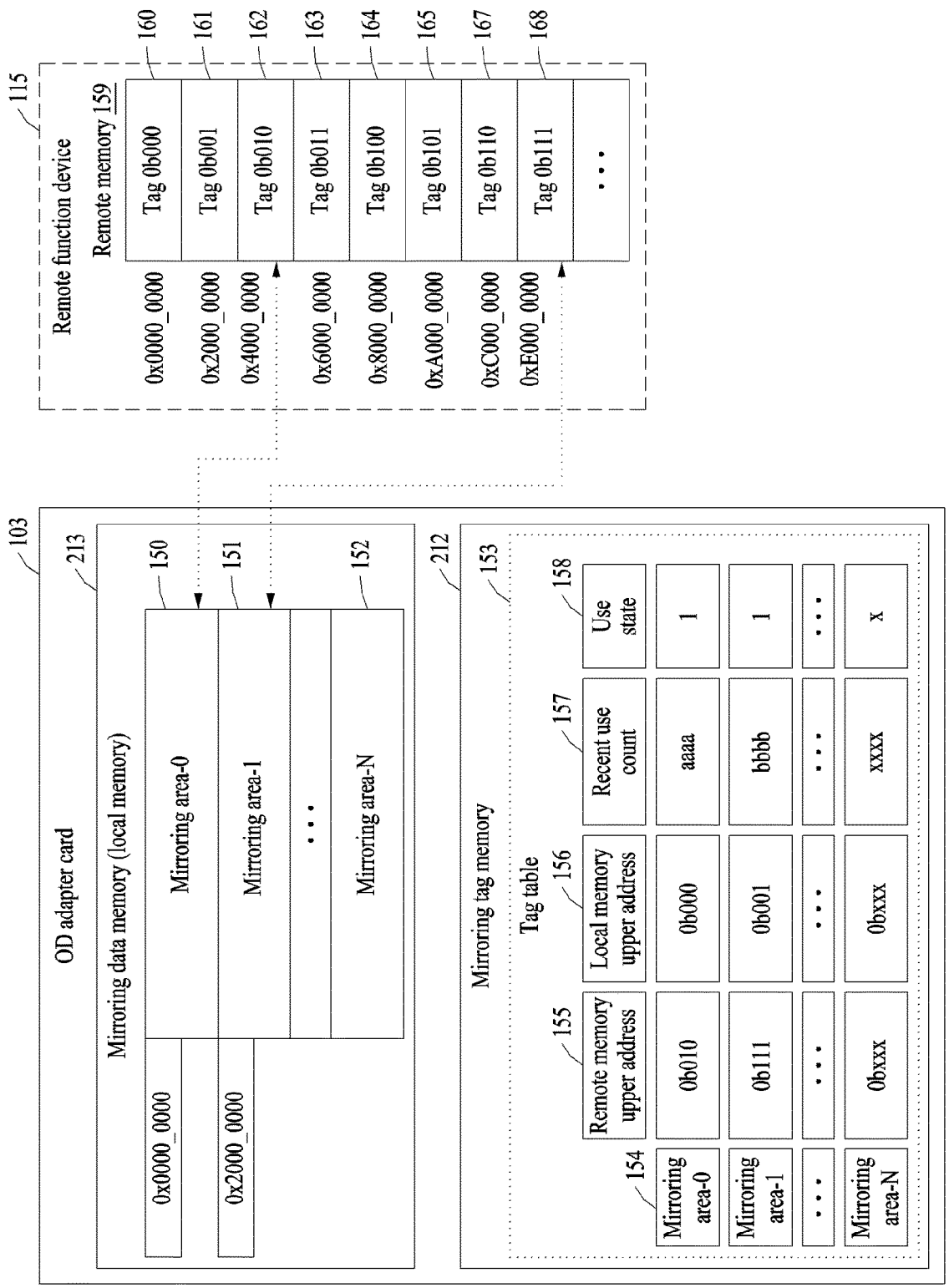
FIG. 4 is a diagram illustrating operations of managing and mirroring a memory area of a remote function extension device, according to an embodiment.

FIG. 4 is a diagram illustrating operations of managing and mirroring a local memory of a CPU, according to an embodiment.

Referring to FIG. 4, the CPU OD adapter 104 of the OD adapter card 103 may divide an address space of a remote memory 159 of a remote function device 115 into one or more remote memory areas 160 to 168. The CPU OD adapter 104 may perform local mirroring on the memory areas 162 and 168 corresponding to some of the remote memory areas 160 to 168, which are divided. For example, the memory area 162 may be mirrored in a mirroring area-0 150 of mirroring data memory. The CPU OD adapter 104 may mirror the remote memory 168 in a mirroring area-1 151 of the mirroring data memory.

The remote function extension device 101 may register the remote memory areas 160 to 168 in a tag table 153 of a mirroring tag memory 212 for performing mirroring. Each entry of the tag table 153 may include a mirroring area index 154, a remote memory upper address 155, a local memory upper address 156, a recent use count 157, and use state information 158. Here, the mirroring area index 154 may serve as an index for each entry in the tag table 153 and may indicate mirroring areas 150 to 152. The number of entries in the tag table 153 may be the same as the number of mirroring areas 150 to 152.

The remote memory upper address 155 may include upper addresses of the remote memory areas 160 to 168, which are targets for mirroring. The local memory upper address 156 may include upper addresses of the mirroring areas 150 to 152. The recent use count 157 may increase whenever the CPU 102 accesses data of the mirroring areas 150 to 152 and may decrease when the CPU 102 does not access the data for a predetermined period of time. The use state information 158 may indicate whether a corresponding entry is valid (whether the entry may be used). Mirroring may be performed by registering the upper addresses of the memory areas 160 to 168 of the remote memory and the upper addresses of the mirroring areas 150 to 152 in the tag table 153 and then activating a value of the use state information 158.

When the CPU 102 attempts to access the remote memory areas 160 to 168 through the OD adapter card 103, the remote function extension device 101 may compare the upper addresses of the remote memory areas 160 to 168 to the remote memory upper addresses 155 of valid entries in the tag table 153, through a mirroring management function. When the remote function extension device 101 finds an entry having the same value as the upper addresses of the remote memory area 160 to 168 of the remote memory, the remote function extension device 101 may identify a state value of mirrored state matrices with respect to mirroring by referring to mirroring line indexes corresponding to middle and lower addresses of the local memory.

Here, the mirroring line may refer to each area obtained by dividing the mirroring areas 150 to 152 into predetermined sizes. The mirroring line indexes may refer to addresses indicating mirroring lines in the mirroring areas 150 to 152. The mirrored state matrices may indicate whether valid data actually exists in a mirroring line.

The tag table 153 may include the use state information 158 related to mirroring and may include upper address information the remote memory upper address 155 and the local memory upper address 156, which are necessary for mirroring. The mirrored state matrices may indicate, in units of mirroring lines, whether data of the remote memory areas 160 to 168, which are being mirrored, exists in the mirroring areas 150 to 152.

Each bit of mirrored state matrices may indicate whether remote data of the mirroring lines exists. Accordingly, the remote function extension device 101 may find the mirroring areas 150 to 152 in the tag table 153 with the upper address of a remote memory address that the remote function extension device 101 attempts to access and may identify whether data of a mirroring line exists in the mirrored state matrices with middle and lower addresses, which are mirroring line indexes.

Figure 5:
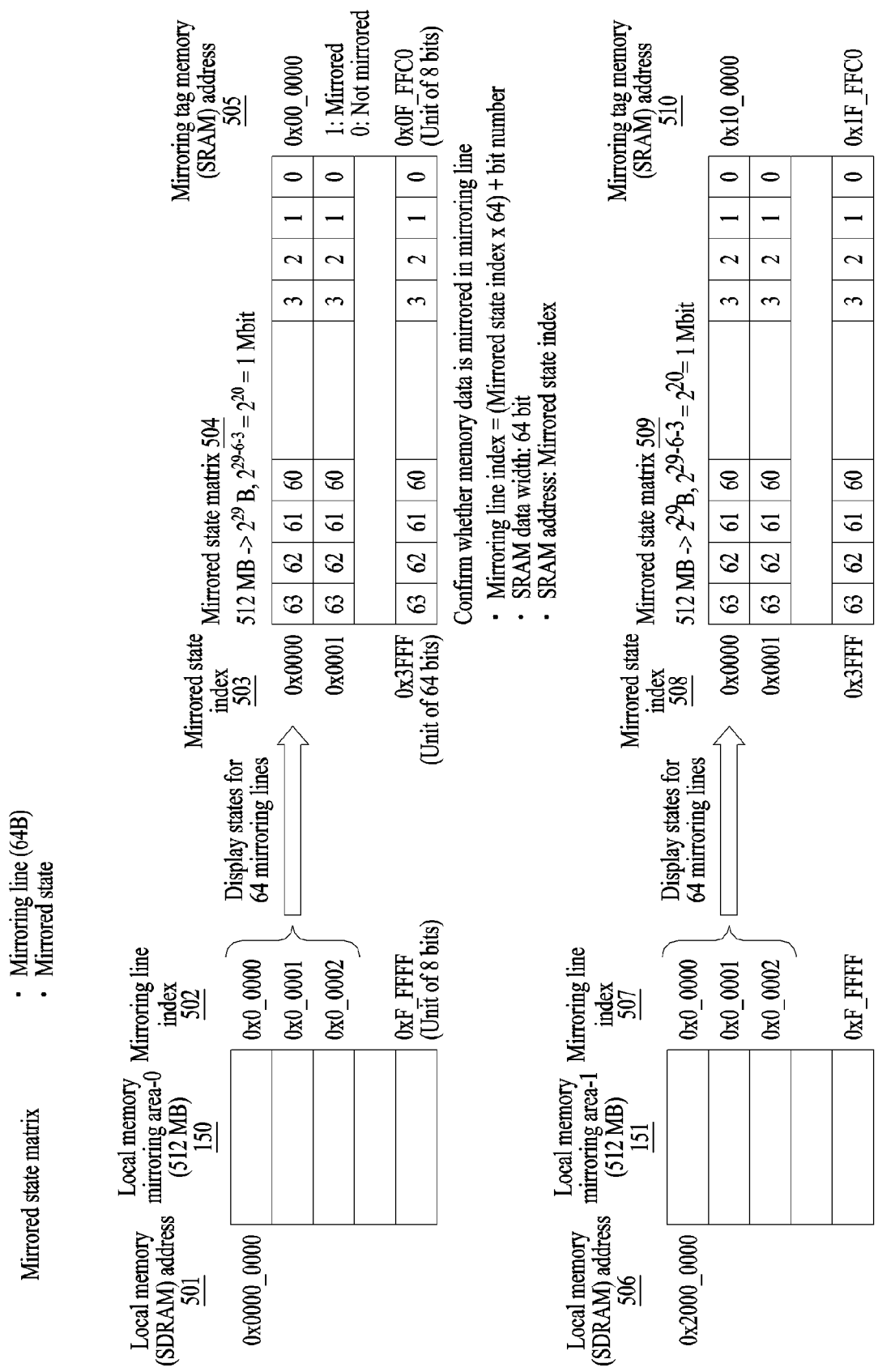
FIG. 5 is a diagram illustrating a mirrored state matrix for a memory area of a remote function extension device, according to an embodiment.

FIG. 5 is a diagram illustrating a mirrored state matrix for a memory area of the remote function extension device, according to an embodiment.

Referring to FIG. 5, the remote function extension device 101 may perform each function illustrating a mirrored state matrix. Each function is described as follows.

The mirroring function 201 may divide mirroring areas 150 to 151 into mirroring lines at a certain size. Mirroring line indexes 502 and 507 may be addresses used to indicate mirroring lines in the mirroring areas 150 to 151. Upper addresses of local memory addresses 501 and 506 may be used to indicate the mirroring areas 150 to 151. Middle and lower addresses may be used as the mirroring line indexes 502 and 507. In addition, each of the mirroring areas 150 to 151 may have mirrored state matrices 504 and 509.

Each bit of the mirrored state matrices 504 and 509 may indicate whether remote data exists in a mirroring line. Mirrored state indexes 503 and 508 may be access addresses of the mirrored state matrices 504 and 509. The mirrored state indexes 503 and 508 may be upper bits of the mirroring line indexes 502 and 507. The number of used bits may vary depending on access bus widths of the mirrored state matrices 504 and 509. Mirroring tag memory addresses 505 and 510 may be access addresses of the mirrored state matrices 504 and 509 in a unit of bits.

The mirroring function 201 may indicate that upper addresses of the remote memory areas 160 to 168 of the remote memory, which the CPU 102 attempts to access, may be registered in the tag table 153 and mirrored. The mirroring function 201 may identify the effectiveness of the mirroring line of the mirrored state matrices 504 and 509 using middle and lower addresses corresponding to the mirroring line indexes 502 and 507.

When bits of the mirrored state matrices 504 and 509 are mirrored, the remote function extension device 101 may control the CPU 102 to read or write data from the mirroring areas 150 to 151 of the local memory. In addition, when bits of the mirrored state matrices 504 and 509 are not mirrored, the remote function extension device 101 may retrieve data from the remote memory areas 160 to 168 and save the data in the mirroring areas 150 to 151 of the local memory. When the data is stored in the mirroring areas 150 to 151, the remote function extension device 101 may mirror bits of the mirrored state matrices 504 and 509.

In addition, the mirroring function 201 of the remote function extension device 101 may pre-read data around the data accessed by the CPU 102, store the pre-read data in the mirroring areas 150 to 152, and update the mirrored state matrices 504 and 509.

Figure 6:
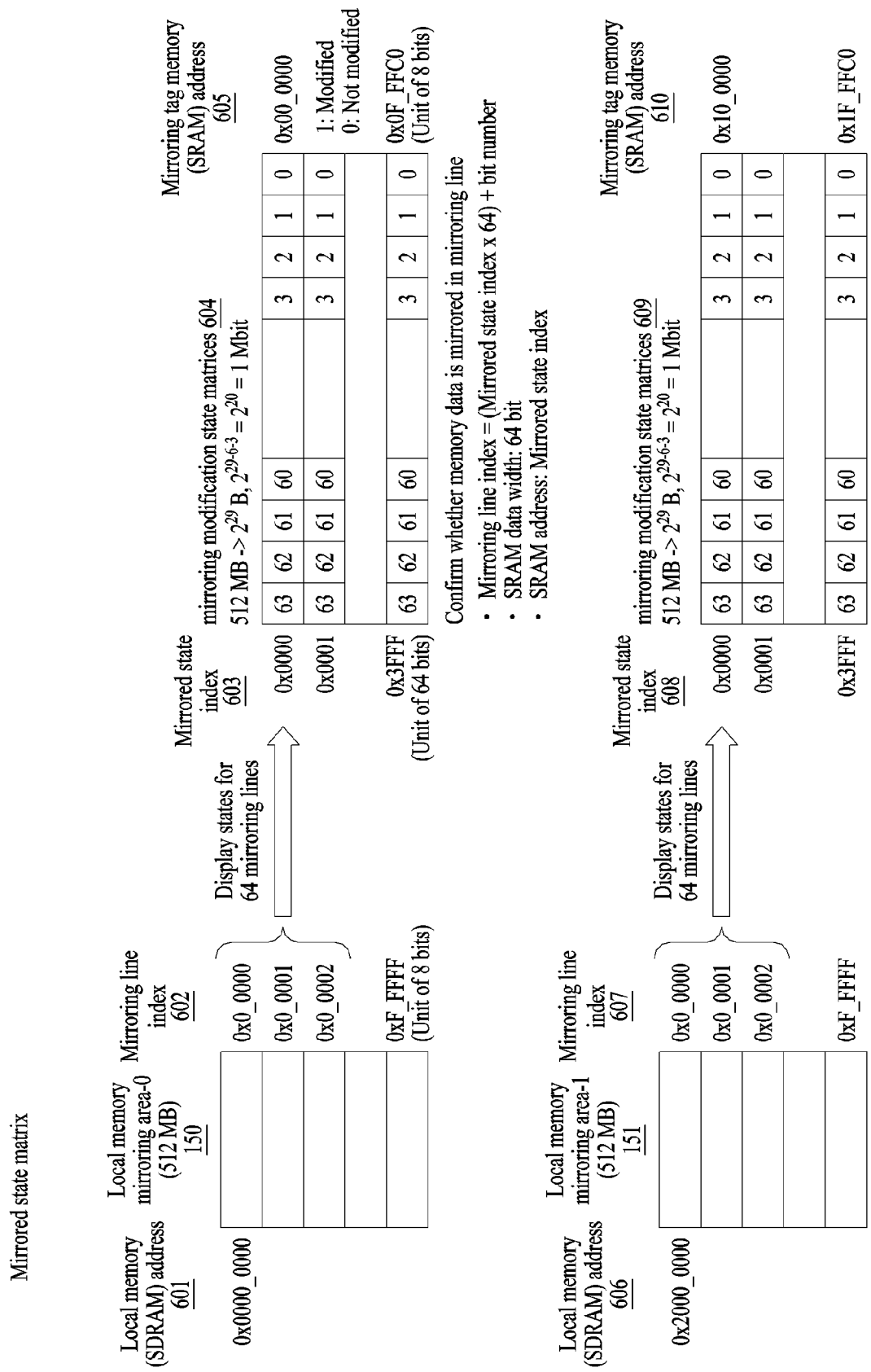
FIG. 6 is a diagram illustrating a modification that is displayed through a mirrored state matrix, according to an embodiment.

FIG. 6 is a diagram illustrating a modification displayed through a mirrored state matrix, according to an embodiment.

Referring to FIG. 6, a mirroring function 201 of a remote function extension device 101 may display, as a modified state, state values of mirroring modification state matrices 604 and 609 when a CPU 102 modifies mirroring areas 150 to 151 of a local memory.

Mirroring line indexes 602 and 607 may represent addresses used to indicate mirroring lines in the mirroring areas 150 to 151. Upper addresses 601 and 606 of the local memory may be used to indicate the mirroring areas 150 to 151, and middle and lower addresses of the local memory may be used as the mirroring line indexes 602 and 607.

Each of the mirroring areas 150 to 151 may have the mirroring modification state matrices 604 and 609. Each bit of the mirroring modification status matrices 604 and 609 may indicate whether data in the mirroring areas 150 to 151 of the local memory is modified. The mirrored state indexes 603 and 608 may indicate access addresses of the mirroring modification state matrices 604 and 609.

The mirrored state indexes 603 and 608 may be upper bits of the mirroring line indexes 602 and 607. The number of used bits may vary depending on the access bus widths of the mirroring modification state matrices 604 and 609. Mirroring tag memory addresses 605 and 610 may be access addresses of the mirrored modification state matrices 604 and 609 in a unit of bits.

When the CPU 102 modifies data, which is mirrored and exists in the mirroring areas 150 to 151 of the local memory, the mirroring function 201 of the remote function extension device 101 may modify bits of mirroring lines to which the data belongs in the mirroring modification state matrices 604 and 609. When the number of bits modified in the mirroring modification state matrices 604 and 609 is equal to or greater than a certain number, the mirroring function 201 of the remote function extension device 101 may reflect local data of a modified state in the remote memory areas 160 to 168 and match the local data of the modified state to the remote memory areas 160 to 168 and may not modify the bits of the modified state.

Figure 7:
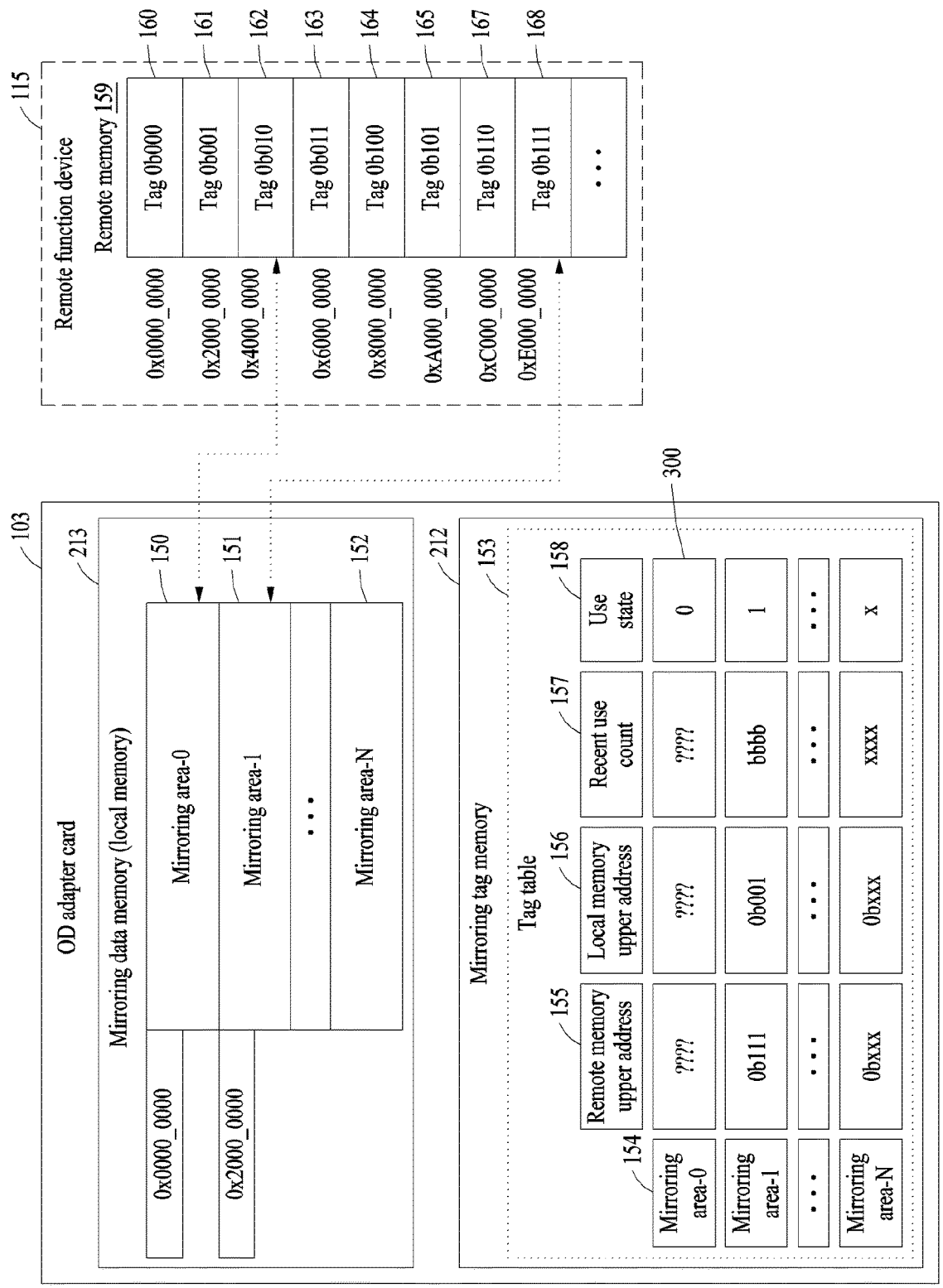
FIG. 7 is a diagram illustrating an operation of additionally registering a new remote memory area based on a tag table related to a memory area, according to an embodiment.

FIG. 7 is a diagram illustrating an operation of additionally registering a new remote memory area based on a tag table related to a memory area, according to an embodiment.

Referring to FIG. 7, the remote function extension device 101 may additionally perform local mirroring on new remote memory areas when there is an empty entry in a tag table indicating whether a mirroring area of a remote memory is mirrored.

When the CPU 102 accesses remote memory areas 160 to 168 that are not mirrored, the remote function extension device 101 may newly register the remote memory areas 160 to 168 in a mirroring tag entry 300 which is empty in a tag table 153 according to the mirroring function 201. The remote function extension device 101 may mirror the remote memory areas 160 to 168 of the remote memory in the mirroring areas 150 to 152 of the mirroring tag entry 300. An empty entry may be identified by examining use state information 158 of each entry.

The mirroring function 201 of the remote function extension device 101 may initialize each of state values of mirrored state matrices and each of state values of mirroring modification state matrices, with respect to the mirroring areas 150 to 152. The mirroring function 201 of the remote function extension device 101 may activate a use state of the mirroring tag entry 300 when the operation of mirroring described above is completed.

When the CPU 102 reads remote data, the CPU OD adapter 104 may retrieve data from the memory areas 160 to 168 of the remote memory and transmit the data to the CPU 102. The CPU OD adapter 104 may store the data in the mirroring areas 150 to 152 of the local memory and update the mirrored state matrices.

When the remote function extension device 101 performs writing on the remote memory, the remote function extension device 101 may retrieve data from the memory areas 160 to 168 of the remote memory and store the data in the mirroring areas 150 to 152 of the local memory. After the remote function extension device 101 updates the mirrored state matrices, the CPU 102 may modify data of the mirroring areas 150 to 152 of the local memory.

Figure 8:
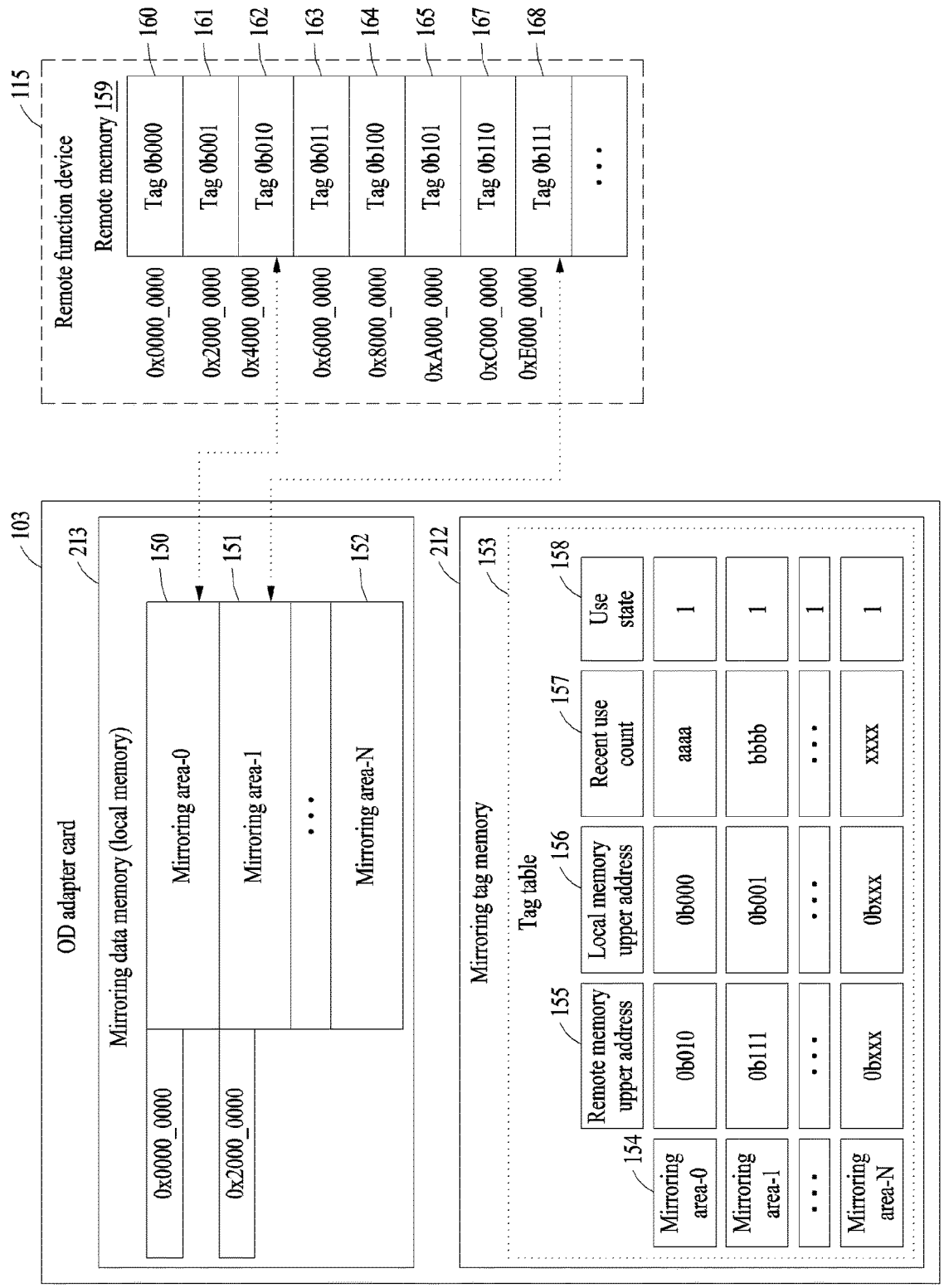
FIG. 8 is a diagram illustrating an operation of additionally registering a new remote memory area based on a tag table related to a memory area, according to another embodiment.

FIG. 8 is a diagram illustrating an operation of additionally registering a new remote memory area based on a tag table related to a memory area, according to another embodiment.

Referring to FIG. 8, the remote function extension device 101 may additionally perform local mirroring on a new area of a remote memory when there is no empty entry in a tag table 153 indicating whether a mirroring area of the remote memory is mirrored.

When a CPU 102 accesses remote memory areas 160 to 168 that are not mirrored and no empty space exists in the tag table 153, the remote function extension device 101 may select an entry, in which a recent use count 157 is small, and delete contents of the entry.

The remote function extension device 101 may initialize a state value of a mirrored state matrix and a state value of a mirroring modification state matrix with respect to the deleted entry and then newly register remote memory areas 160 to 168 in the deleted entry.

When there is data of a modified state before initializing the mirroring modification state matrix of the deleted entry, the remote function extension device 101 may transmit the modified data and an applicable address to a remote function device 115. The remote function device 115 may update the contents of the remote memory areas 160 to 168 of the remote memory using the modified data and the applicable address.

Figure 9:
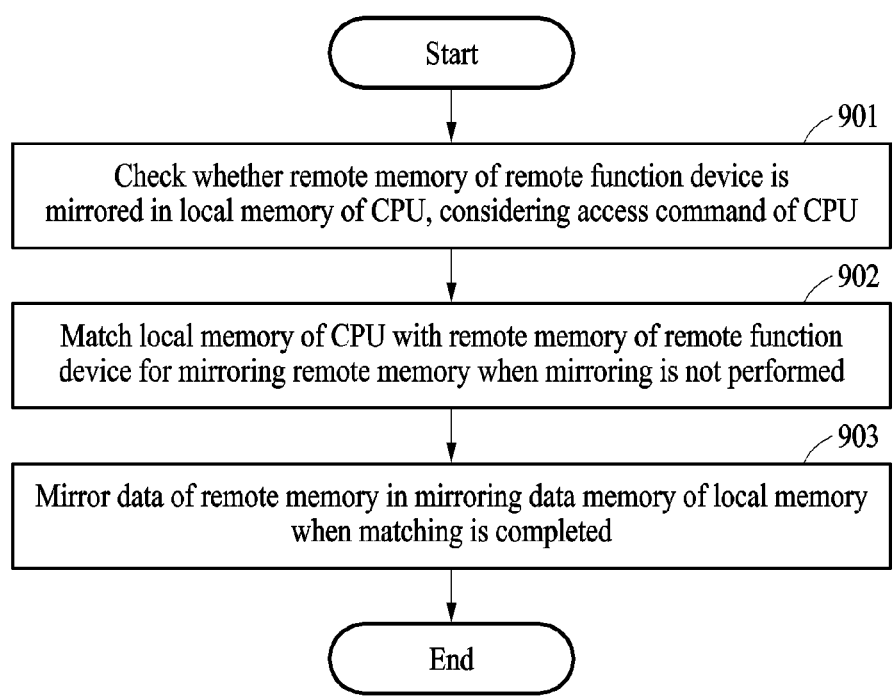
FIG. 9 is a flowchart illustrating a method of extending a remote function, according to an embodiment.

FIG. 9 is a flowchart illustrating a method of extending a remote function, according to an embodiment.

In operation 901, a remote function extension device may receive, from a CPU, an access request message for accessing data of a remote memory and transmit the access request message to a remote function device through an optical connection network. The remote function extension device may receive, from the remote function device, an access response message in response to the access request message and establish an interconnection for available resources between the remote function extension device and the remote function device. The remote function extension device may match a physical layer between the CPU and the optical connection network.

That is, the remote function extension device may determine whether the remote memory of the remote function device may be used through a remote resource management agent of the remote function extension device. The remote function extension device may modify a remote function, considering a result of determining whether the remote memory of the remote function device may be used. That is, the remote function extension device may perform one of a resource collection connection function and a natural collection release function from the remote memory, considering the result of whether the remote memory of the remote function device may be used. The remote function extension device may modify a state of the remote function extension device so that the remote function is extended in response to the performed function.

Accordingly, the remote function extension device may indicate whether local data, which mirrors a remote address space, is modified. In addition, the remote function extension device may pre-read data of the remote address space accessed by the CPU in the background to store the pre-read data in a mirroring area of the local memory.

In this case, when the number of pieces of data to be stored or modified in the mirroring area of the local memory increases beyond a predetermined boundary value, the remote function extension device may update a modified data value in the remote address space where the data to be stored or modified has existed.

When an interconnection is completed, the remote function extension device may check whether the remote memory of the remote function device is mirrored in the local memory of the CPU, considering an access command of the CPU. The local memory of the CPU may be divided into a mirroring data memory and a mirroring tag memory.

Here, the mirroring tag memory may be a memory where data for managing a mirroring area is stored. The mirroring data memory may be a memory where the remote function extension device stores data of a remote address space.

Using at least one of a mirrored state matrix and a tag table included in the mirroring tag memory, the remote function extension device may check whether the remote memory is mirrored in the mirroring data memory.

In operation 902, the remote function extension device may match the local memory of the CPU with the remote memory of the remote function device for mirroring the remote memory when mirroring is not performed. The remote function extension device may register, in the tag table, a plurality of memory areas included in the remote memory of the remote function device. Upon completion of registration, the remote function extension device may match the plurality of memory areas to a plurality of mirroring areas included in the mirroring data memory by using an upper address of the remote memory designating the plurality of memory areas.

In operation 903, when the matching is completed, the remote function extension device may mirror data of the remote memory in the mirroring data memory of the local memory. When a request for registration of the remote memory in the tag table is made, the remote function extension device may check whether there is an empty space for registration in the tag table.

When there is no empty space, the remote function extension device may delete an entry of the tag table, considering the number of uses of a mirroring area of the tag table.

The remote function extension device may perform mirroring between the remote memory and the local memory by registering the remote memory in the tag table from which an entry is deleted.

Here, the remote function extension device may mirror data stored in N memory areas among the plurality of memory areas included in the remote memory in N mirroring areas among the plurality of mirroring areas included in the mirroring data memory.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The method according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductive wire memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed embodiments, can be made.

What is claimed is:

1. A method of extending a remote function, the method being performed by a remote function extension device and comprising:
   determining whether a remote memory of a remote function device is usable through a remote resource management agent;
   modifying a remote function, in response to a result of the determining of whether the remote memory of the remote function device is usable;
   identifying whether the remote memory of the remote function device is mirrored in a local memory of a central processing unit (CPU), in response to an access command of the CPU according to the modifying of the remote function, wherein the local memory is divided into a mirroring data memory and a mirroring tag memory;
   matching the local memory of the CPU to the remote memory of the remote function device so as to mirror with respect to the remote memory when the remote memory of the remote function device is not mirrored in the local memory of the CPU; and
   mirroring data of the remote memory in the mirroring data memory of the local memory when the matching is completed,
   wherein the mirroring of the data of the remote memory comprises locally mirroring, in the mirroring data memory of the local memory, data stored in one or more memory areas in the remote memory of the remote function device, wherein the remote memory is divided into a plurality of memory areas by the remote function extension device,
   wherein the mirroring comprises:
   identifying whether an empty space exists for a registration of the remote memory in a tag table when a request for the registration of the remote memory in the tag table is made;
   deleting an entry of the tag table, in response to the number of uses with respect to a mirroring area of the tag table when the empty space does not exist; and
   performing mirroring between the remote memory and the local memory by registering the remote memory in the tag table from which the entry is deleted.

2. The method of claim 1, wherein the modifying of the remote function comprises:
   performing one of a resource collection connection function and a natural collection release function from the remote memory, in response to whether the remote memory of the remote function device is usable; and
   modifying a state of the remote function extension device such that the remote function is extended in response to the performed function.

3. The method of claim 1, wherein the identifying comprises identifying whether the remote memory is mirrored in the mirroring data memory by using at least one of a mirrored state matrix and a tag table comprised in the mirroring tag memory.

4. The method of claim 3, wherein the identifying comprises, when the remote memory is mirrored in the mirroring data memory, performing relaying according to the access command such that the CPU accesses the data of the remote memory in the mirroring data memory.

5. The method of claim 3, wherein the matching comprises:
   registering, in the tag table, the plurality of memory areas comprised in the remote memory of the remote function device; and
   matching the plurality of memory areas to a plurality of mirroring areas comprised in the mirroring data memory by using a remote memory upper address that designates the plurality of memory areas when the registering is completed.

6. The method of claim 1, wherein the mirroring comprises mirroring data pieces, which are stored in N memory areas among the plurality of memory areas comprised in the remote memory, in N mirroring areas, respectively, among a plurality of mirroring areas comprised in the mirroring data memory.

7. The method of claim 6, wherein the mirroring comprises:
   when the data pieces stored in the N memory areas are mirrored in the N mirroring areas, respectively, displaying a state of the mirrored data pieces stored in the N memory areas on a mirrored state matrix as a mirrored state; and
   when data of the mirroring data memory is modified, displaying a state of the modified data on the mirrored state matrix as a modified state.

8. The method of claim 1, wherein the deleting comprises:
   transmitting, to the remote function device, modified data and a local memory upper address of the mirroring data memory when the modified data exists in the mirroring data memory before deleting a mirrored state matrix of the entry; and
   deleting the entry of the tag table when the transmitting of the modified data and the local memory upper address of the mirroring data memory is completed.

9. The method of claim 1, wherein a function of each of the remote resource management agent and a remote resource management connector that serves as a physical connection connector for the remote resource management agent is performed using a CPU and a network port of a CPU blade in which the remote function extension device is included.

10. A method of extending a remote function, the method being performed by a remote function extension device and comprising:

transmitting an access request message to a remote function device through an optical connection network by receiving the access request message for accessing data of a remote memory from a central processing unit (CPU);

establishing an interconnection for available resources between the remote function extension device and the remote function device by receiving, from the remote function device, an access response message with respect to the access request message; and performing mirroring between a local memory of the CPU and the remote memory of the remote function device, in response to an access command of the CPU according to the access response message, wherein the performing comprises:

determining whether the remote memory of the remote function device is usable through a remote resource management agent;

modifying a remote function, in response to a result of the determining of whether the remote memory of the remote function device is usable;

identifying whether the remote memory of the remote function device is mirrored in the local memory of the CPU, in response to an access command of the CPU according to the modifying of the remote function, wherein the local memory is divided into a mirroring data memory and a mirroring tag memory;

matching the local memory of the CPU to the remote memory of the remote function device so as to mirror with respect to the remote memory when the remote memory of the remote function device is not mirrored in the local memory of the CPU; and mirroring data of the remote memory in the mirroring data memory of the local memory when the matching is completed, wherein the mirroring comprises:

identifying whether an empty space exists for a registration of the remote memory in a tag table when a request for the registration of the remote memory in the tag table is made;

deleting an entry of the tag table, in response to the number of uses with respect to a mirroring area of the tag table when the empty space does not exist; and performing mirroring between the remote memory and the local memory by registering the remote memory in the tag table from which the entry is deleted.

11. The method of claim 10, wherein the transmitting comprises:

extracting the access request message of the CPU with respect to the remote memory;

converting a destination address of the access request message based on an address system of the remote memory and generating a serialized data request frame that is interpretable to the remote function device; and transmitting the data request frame to the remote function device through the optical connection network.

12. The method of claim 10, wherein the establishing comprises:

receiving, from the remote function device, a data response frame related to the access response message in response to a data request frame; and extracting the access response message comprised in the data response frame and establishing an interconnection for available resources between the remote function extension device and the remote function device.

13. The method of claim 10, wherein the mirroring comprises locally mirroring, in the mirroring data memory of the local memory, data stored in one or more memory areas in the remote memory of the remote function device, wherein the remote memory is divided into a plurality of memory areas by the remote function extension device.

14. The method of claim 13, wherein the matching comprises:

registering the plurality of memory areas comprised in the remote memory of the remote function device in a tag table of the mirroring tag memory; and matching the plurality of memory areas to a plurality of mirroring areas comprised in the mirroring data memory by using a remote memory upper address that designates the plurality of memory areas when the registering is completed.

15. The method of claim 13, wherein the mirroring comprises mirroring data pieces, which are stored in N memory areas among the plurality of memory areas comprised in the remote memory, in N mirroring areas, respectively, among a plurality of mirroring areas comprised in the mirroring data memory according to the interconnection.

16. The method of claim 15, wherein the mirroring comprises, when the data pieces stored in the N memory areas are mirrored in the N mirroring areas, respectively, displaying a state of the mirrored data pieces stored in N memory areas on a mirrored state matrix as a mirrored state.

17. The method of claim 16, wherein the mirroring comprises when data of the mirroring data memory is modified, displaying a state of the modified data on the mirrored state matrix as a modified state.

18. A remote function extension device for performing a remote function extension method, the remote function extension device comprising:

a processor, wherein the processor is configured to:

determine whether a remote memory of a remote function device is usable through a remote resource management agent;

modify a remote function, in response to a result of the determining of whether the remote memory of the remote function device is usable;

identify whether the remote memory of the remote function device is mirrored in a local memory of a central processing unit (CPU), in response to an access command of the CPU according to the modifying of the remote function, wherein the local memory is divided into a mirroring data memory and a mirroring tag memory;

match the local memory of the CPU to the remote memory of the remote function device so as to mirror with respect to the remote memory when the remote memory of the remote function device is not mirrored in the local memory of the CPU; and mirror data of the remote memory in the mirroring data memory of the local memory when the matching is completed, wherein, when the processor mirrors the data of the remote memory in the mirroring data memory, the processor is configured to locally mirror, in the mirroring data memory of the local memory, data stored in one or more memory areas in the remote memory of the remote function device, wherein the remote memory is divided into a plurality of memory areas by the remote function extension device, wherein the processor is further configured to:
identify whether an empty space exists for a registration of the remote memory in a tag table when a request for the registration of the remote memory in the tag table is made,
delete an entry of the tag table, in response to the number of uses with respect to a mirroring area of the tag table when the empty space does not exist, and
perform mirroring between the remote memory and the local memory by registering the remote memory in the tag table from which the entry is deleted.

* * * * *